United States Patent
Jesse et al.

(10) Patent No.: US 7,606,594 B2
(45) Date of Patent: Oct. 20, 2009

(54) RADIO SYSTEM HAVING DISTRIBUTED REAL-TIME PROCESSING

(75) Inventors: Mary Jesse, Sammamish, WA (US); Elliott Hoole, Sammamish, WA (US); Robert G. Mechaley, Jr., Kirkland, WA (US); Greg Veintimilla, Sammamish, WA (US)

(73) Assignee: RadioFrame Networks, Inc., Bellevue, WA (US)

( * ) Notice: Subject to any disclaimer, the term of this patent is extended or adjusted under 35 U.S.C. 154(b) by 1537 days.

(21) Appl. No.: 10/373,626

(22) Filed: Feb. 24, 2003

(65) Prior Publication Data

US 2004/0014466 A1 Jan. 22, 2004

Related U.S. Application Data

(60) Provisional application No. 60/359,637, filed on Feb. 25, 2002.

(51) Int. Cl.
*H04M 1/00* (2006.01)

(52) U.S. Cl. .............. 455/554.1; 455/552.1; 455/554.2; 455/555; 370/400; 370/401

(58) Field of Classification Search ................ 455/557, 455/552.1–556.1, 558, 565, 562.1, 422.1; 370/338, 401, 395.1, 400, 349, 337, 347, 370/468; 379/33, 93.05, 301, 93.07
See application file for complete search history.

(56) References Cited

U.S. PATENT DOCUMENTS

| | | | |
|---|---|---|---|
| 5,905,957 A * | 5/1999 | Olds | 455/435.1 |
| 6,005,884 A | 12/1999 | Cook et al. | 375/202 |
| 6,078,622 A | 6/2000 | Boytim et al. | 375/257 |
| 6,122,083 A | 9/2000 | Ohta et al. | 359/137 |
| 6,370,394 B1 * | 4/2002 | Anttila | 455/417 |
| 6,385,195 B2 | 5/2002 | Sicher et al. | 370/356 |
| 6,434,139 B1 | 8/2002 | Liu et al. | 370/352 |
| 6,542,754 B1 | 4/2003 | Sayers et al. | 455/502 |
| 6,560,216 B1 | 5/2003 | McNiff et al. | 370/349 |
| 2006/0050719 A1 * | 3/2006 | Barr et al. | 370/401 |

OTHER PUBLICATIONS

Anon, "iDEN Technical Overview", Motorola, Aug. 16, 1998.

* cited by examiner

*Primary Examiner*—Duc Nguyen
*Assistant Examiner*—Dominic E Rego
(74) *Attorney, Agent, or Firm*—Van Pelt, Yi & James LLP

(57) ABSTRACT

A distributed radio system is disclosed. Transmit and receive packets of data are transported over a relatively high-speed multiplexed network, which in one embodiment may be an Ethernet network. The distributed radio system comprises in one embodiment a centrally-located network-level processing unit connected via network connections to one or more intermediate-level processing units. The intermediate-level processing units may be distributed throughout the coverage area. The processing units perform digital signal processing, as well as higher level processing such as signal routing, speech transcoding and proper interfacing to external environments, such as a macrocellular environment. Radio elements are provided that are accurately timed or synchronized, such that the radio elements have their own time base to ensure proper transmission, even when unpredictable network delays occur.

56 Claims, 8 Drawing Sheets

RADIO SYSTEM HAVING DISTRIBUTED REAL-TIME PROCESSING

CROSS-REFERENCE TO RELATED APPLICATIONS

The benefit of the filing date of provisional Application Ser. No. 60/359,637, filed on Feb. 25, 2002, is hereby claimed for this application under 35 U.S.C. § 119(e).

FIELD OF THE INVENTION

This invention relates generally to distributed radio systems, and more particularly to a radio system having distributed real-time processing through a digital network.

BACKGROUND

A wide variety of wireless communications devices and standards have proliferated in recent years. Cellular telephones used for voice communications may be configured to operate in accordance with one of a variety of standards for wireless voice communications, including GSM, iDEN, and other standards. Other wireless devices, such as personal digital assistants (PDA's) and other devices, may be configured to exchange data by wireless communication with public and/or private networks, such as the Internet. In addition, wireless local area network (WLAN) technology enables computers and other devices to be connected to networks through wireless communications, such as via a WLAN operating under the IEEE 802.11b standard.

To support the use, in a building or other defined service area, of one or more of the many wireless device types and standards available now and/or in the future, a typical prior art installation would comprise a plurality of antennas distributed throughout the service area, with each antenna being connected by a cable to a centrally located processing system. FIG. 1 shows a typical prior art wireless communication system. The wireless communication system 100 of FIG. 1 comprises a plurality of radio antennas 102, 104, 106, 108 and 110 connected by cables 112, 114, 116, 118, and 120, respectively, to a centrally located processing system 122.

One shortcoming of the approach illustrated in FIG. 1 and described above is that it can be inefficient to transmit the modulated RF signal by cable to the centrally located processing system for processing. This shortcoming is exacerbated in installations that may be required to support multiple users at the same time in or near the same area. Apart from the increased costs associated with additional antennas and cable, the centrally located processing system may not be able to perform all the required processing with the speed and accuracy that may be required to support real-time communications, such as real-time voice communications by wireless telephone.

A further disadvantage arises where users may wish to use two or more dissimilar wireless devices and/or standards in the same service area. Prior to the introduction of the technology disclosed herein, for example, to support two different types of wireless device and/or standard a first set of antennas would typically be provided to receive and transmit radio-frequency (RF) signals under the first standard and a second set of antennas would likewise typically be provided to receive and transmit RF signals under the second standard. Each antenna of the first set would be connected via a suitable cable to a first centrally located processing system associated with the first standard, and each antenna of the second set would likewise be connected via a suitable cable to a second centrally located processing system associated with the second standard. Data sent under the first standard would be processed at the first centrally located processing system in accordance with the first standard, and data sent under the second standard would be processed at the second centrally located processing system in accordance with the second standard. The capacity of such a system is limited by the processing capacity of the centrally located processing systems and the bandwidth (information carrying capacity) of the cables connected the respective antennas to the corresponding centrally located processing system(s). In addition, due in large part to the quantity of cable that must be purchased and installed, such an approach may not be cost effective. In addition, it may be difficult to design and install such a system, as many aspects of performance are highly frequency dependent and each device type and/or standard may operate at its own frequency.

Therefore, there is a need for a better way to provide wireless communication services for a defined service area, such as a building. In addition, it would be advantageous to provide a way to provide for the use of dissimilar wireless devices and/or standards in such a service area that does not suffer from the capacity constraints and other disadvantages described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
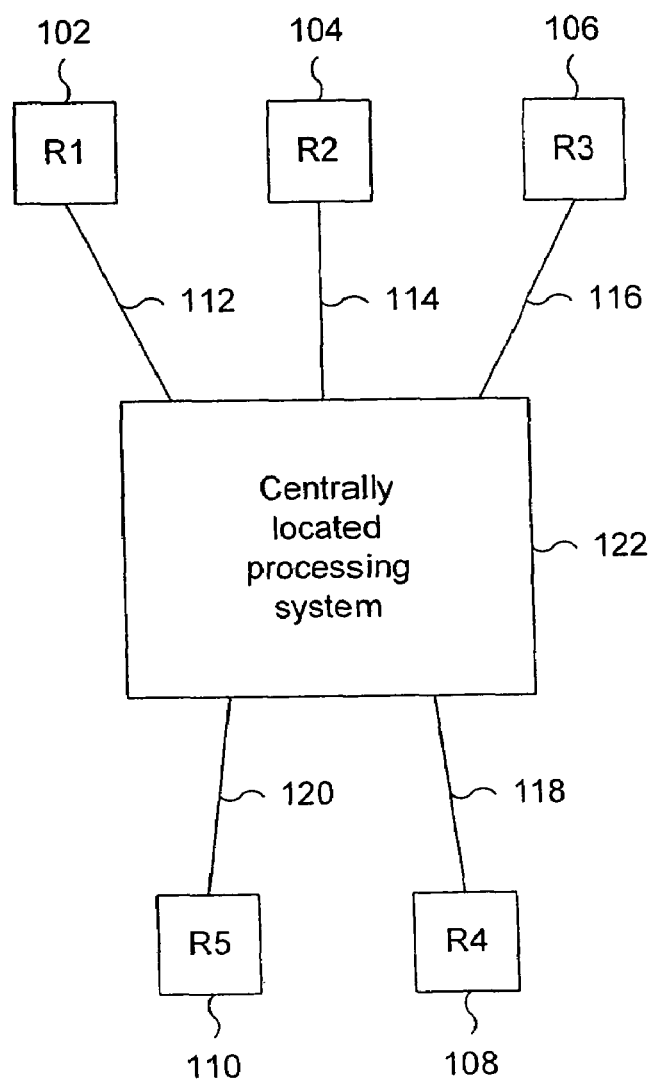
FIG. 1 shows a typical prior art wireless communication system.

A distributed processing radio system is disclosed. In one embodiment, a first level of processing is performed at or relatively near one of a plurality of antennas configured to receive and transmit wireless communications. For example, a received signal may be processed to a first level at or near the antenna. In one embodiment, at this first level the received signal is processed to be in a form suitable for transmission via a digital network connection. The partially processed signal is sent in one embodiment via a network connection to a secondary processing unit for further processing. In one embodiment, a connection other than a network connection may be used. In one embodiment, this further processing comprises extracting from the received signal data in an intermediate or final form recognized and prescribed by the governing wireless communications protocol under which it was sent. The term "protocol-appropriate data unit" will be used herein to refer to data in an intermediate or final form recognized and prescribed by a governing wireless communications protocol, which data may either comprise raw data or may be decoded in accordance with the governing standard to determine raw data encoded therein or, in some embodiments or for some standards, partially decoded. For example, a set of code words encoded in accordance with a governing standard, such as the IEEE 802.11b standard, may in one embodiment comprise a set of protocol-appropriate data units. For a standard such as iDEN, raw data may comprise detected 16 QAM symbols for each of four sub-channels. Under other protocols, the protocol-appropriate data units may comprise raw (i.e., fully decoded) data. In general, decoded data could include control channel information, encoded voice data, pulse code modulated (PCM) voice data, user defined packet data, as well as other decoded data types found in wireless standards.

Once the secondary processing has been completed, the received data, i.e., in the form of a set of protocol-appropriate data units, is sent in one embodiment to a centrally located processing system, which is configured to perform any remaining processing that may be needed, if any, such as protocol-specific processing, to extract and, if appropriate, perform any required operations on or in response to, the raw data originally sent by the device that originated the received signal. In one embodiment, such processing at a centrally located processing system may comprise communicating with an external network, such as the publicly switched telephone network, a public IP network, mobile or cellular telephone networks, or other data and/or telecommunications networks, with respect to or in response to the received data. As used herein, the term "network-level processing" will be used to refer to the above-described processing at a centrally located processing system subsequent to the "secondary processing" described above. As used herein, the term "intermediate-level processing" means the same things as the "secondary processing" described above.

In one embodiment, data to be sent to a wireless device is similarly processed in a distributed manner. Outgoing data is received or generated at a centrally located processing system via a network or other connection or interface. The centrally located processing system processes the data into protocol-appropriate data units suitable for further processing and transmission in accordance with the prescribed protocol. The protocol-appropriate data units are then sent via a digital network to a secondary processing system for further processing into a form suitable for final processing by a distributed processing system at or near an antenna that will be used to transmit the data. At the distributed processing system at or near the antenna, in one embodiment final digital processing and/or RF processing may be performed. The outgoing RF signal is then transmitted via the antenna.

In one embodiment, the processing components described above comprise part of an integrated, private system configured to perform distributed processing with respect to incoming and outgoing signals, as described above, prior to interaction, if any, with any external environment with respect to such incoming and/or outgoing signals. As used herein, an "external environment" is a network or system accessible to and/or used by more than one user or user group, such as a public or private communications or data network accessible by multiple unrelated users or groups of users (such as multiple enterprises). Examples of systems or networks that may comprise "external environments", depending on the embodiment, include without limitation the public switched telephone network (PSTN); mobility communcation networks, such as cellular telephone networks; and shared private and/or public data networks, such as the Internet.

Figure 2:
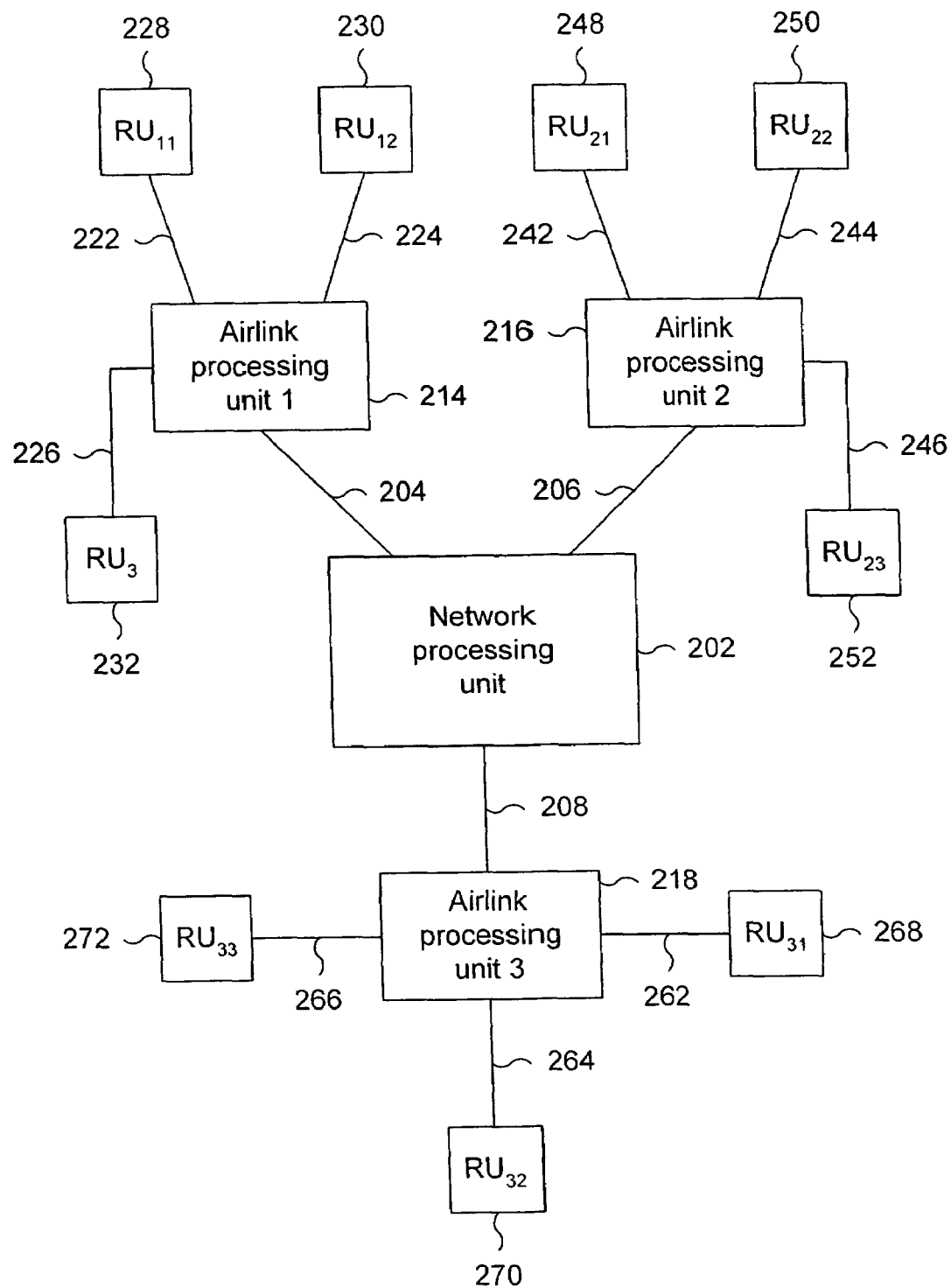
FIG. 2 is a block diagram of a distributed processing radio system provided in one embodiment.

FIG. 2 is a block diagram of a distributed processing radio system provided in one embodiment. A network processing unit 202 is connected via digital network connections 204, 206, and 208 to a plurality of airlink processing units 214, 216, and 218, respectively. Airlink processing unit 214 is connected via digital network connections 222, 224, and 226, to a plurality of radio units 228, 230, and 232, respectively. Likewise, airlink processing unit 216 is connected via digital network connections 242, 244, and 246, to a plurality of radio units 248, 250, and 252, respectively. Likewise, airlink processing unit 218 is connected via digital network connections 262, 264, and 266, to a plurality of radio units 268, 270, and 272, respectively. While connections 204-208, 222-226, and 242-246 are described above as comprising digital network connections, in other embodiments one or more of said connections may comprise a connection other than a network connection, such as a direct connection via a cable.

The airlink processing units shown in FIG. 2 in one embodiment correspond to the secondary processing unit described above and are configured to perform secondary processing as described above, e.g., by receiving a partially-processed received signal via a network connection and further processing the received signal into protocol-appropriate data units, or by receiving a partially-processed outgoing signal in the form protocol-appropriate data units and further processing the data into a form suitable for final processing by a distributed processing system at or relatively near the antenna that will be used to transmit the outgoing signal. In one embodiment, the radio units shown in FIG. 2 correspond to such a distributed processing system at or near the antenna, as described above. In one such embodiment, the radio units are configured to receive RF signals in accordance with a prescribed wireless communication protocol and process such received RF signals into a form suitable for transmission via a digital network (such as via the digital network connections shown in FIG. 2) to a secondary processing system, such as the airlink processing unit shown in FIG. 2. In one embodiment, the radio units shown in FIG. 2 are configured to receive partially processed outgoing data from an associated airlink processing unit and further process the data into a formed suitable for RF transmission in accordance with the applicable wireless standard.

Figure 3:
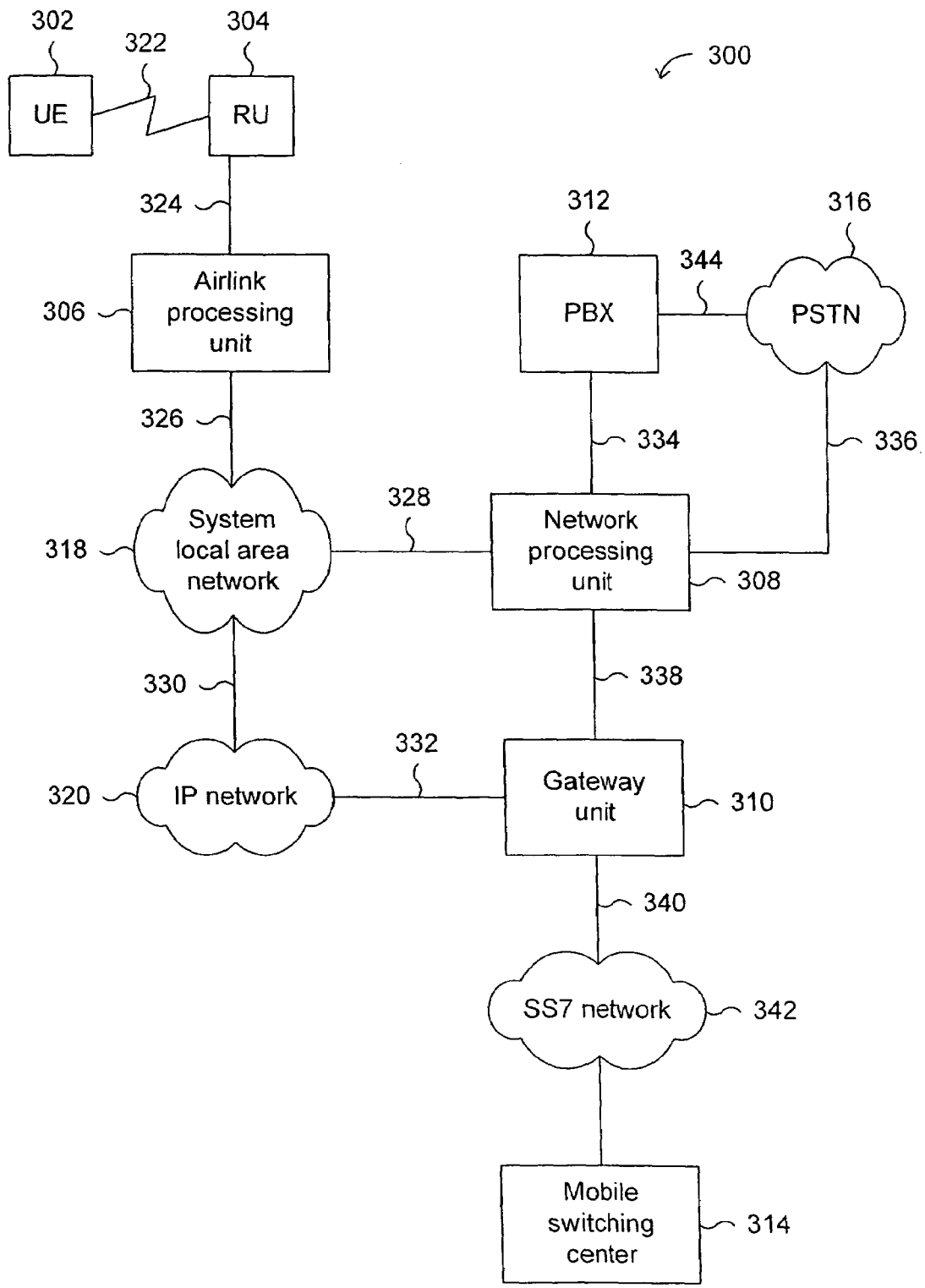
FIG. 3 is a block diagram of one embodiment of a distributed processing radio system integrated with other networks and systems.

FIG. 3 is a block diagram of one embodiment of a distributed processing radio system integrated with other networks and systems. The radio system 300 is comprised of five major network elements, including user equipment 302, one or more radio units such as radio unit 304, one or more airlink processing units such as airlink processing unit 306, one or more network processing units 308, and a gateway unit 310. Two switching entities, including a private branch exchange (PBX) 312 and a mobile switching center (MSC) 314, are also shown. In addition, three external network representations, including a public switched telephone network (PSTN) 316, a system local area network (LAN) 318, and an IP network 320, are also shown. For purposes of simplicity, FIG. 3 illustrates only one of each type of network element, although it will be understood that multiple elements may be included in an actual implementation of the radio system. For example, in an actual implementation, there may be eight radio units such as radio unit 304 associated with each airlink processing unit

306, and there may be multiple airlink processing units 306 associated with each network processing unit 308.

As illustrated in FIG. 3, the user equipment 302 is coupled by a radio interface 322 to the radio unit 304. The radio unit 304 is in turn coupled by a network connection 324 to the airlink processing unit 306. The airlink processing unit 306 is coupled by a network connection 326 to the system local area network 318, which in turn is coupled by a network connection 328 to the network processing unit 308. The system local area network 318 is also coupled by a network connection 330 to IP network 320. In one embodiment, the IP network 320 may comprise a public or private IP network, or some combination of public and private IP networks, with which the radio system 300 is associated. In one embodiment, the IP network 320 may comprise a local area network (LAN) or wide area network (WAN) associated with the radio system 300. Referring further to FIG. 3, the IP network 320 is coupled by a network connection 332 to the gateway unit 310.

The network processing unit 308 is coupled in one embodiment by an interface 334 to the private branch exchange 312, and is also coupled by an interface 336 to the public switched telephone network 316. The PBX 312 is coupled by an interface 344 to the PSTN 316. The network processing unit 308 is also coupled by an interface 338 to the gateway unit 310. The gateway unit 310 is coupled by a network connection 340 to an SS7 network 342, which in turn is coupled by a network connection 344 to the local mobile switching center 314.

As illustrated in FIG. 3, the radio system 300 is an interconnected set of network elements and entities. In one embodiment, system local area network 318 comprises a sub-network through which all airlink processing units 306 and network processing units 308 are interconnected. In one alternative embodiment, system local area network 318 comprises a sub-network through which all radio units 304, airlink processing units 306 and network processing units 308 are interconnected; i.e., the radio units 304 are connected to the airlink processing unit(s) 306 with which they are associated through connections, such as connection 324, which comprise network connections comprising part of system local area network 318. The airlink processing units 306, network processing units 308, and gateway units 310 may have publicly addressable IP addresses or private addresses. In one embodiment, all other communication within the system is routed and switched at the MAC layer (lower half of layer 2) through a system Ethernet backbone. In such an embodiment, the Ethernet is strategically used as the high speed digital communication bus within the system.

The radio system 300 of FIG. 3 is a highly flexible and modular digital communications system that provides wireless access, transport and applications for indoor wireless device users. The system architecture can be made to provide for all cellular and PCS standards currently in use worldwide, including TDMA, CDMA, and GSM. In addition, specialized standards like Motorola's iDEN, and Wireless LAN standards like IEEE 802.11b, can also be supported. The architecture is scalable and flexible, and the system has physical boundaries defined only by the hardware implementations.

In one embodiment, the user equipment 302 may be a wireless device that conforms to a particular standard or proprietary air interface such as GSM, IEEE 802.11, PCS-1900 or iDEN. The device may be a cellular phone, a PCS handset, an 802.11 PCMCIA card or a variety of other devices that interoperate with a GSM, PCS-1900 or iDEN base station, an 802.11 Access Point, or other access points or nodes that may be defined by past, existing, or future wireless standards and protocols.

In one embodiment, the user equipment 302 communicates via a radio link such as radio link 322 to a radio unit such as radio unit 304. Although more than one radio unit 304 may be available to the user equipment 302, a particular radio unit 304 will be designated by the user equipment 302 as most desirable generally based on signal strength or other parameters allowed for configuration within the user equipment 302 or the network. The user equipment 302 can move while communicating in which case the communication link will be handed over to the new best serving radio unit 304 or macrocell.

In one embodiment, the user equipment 302 conforms to the standard wireless A-Interface, which is used to communicate with the radio unit 304. The user equipment 302 originates and terminates voice and/or data connections to other user equipment compatible with user equipment 302, such as telephones, computers, or specialized voice or data devices. The user equipment 302 stores some provisioned information about the user, like the mobile or network IDs, authentication keys, and service preferences. Depending upon the type of information, it is either provisioned by the user, the equipment manufacturer or the service provider. The user equipment 302 devices may be multibanded capable, such that they can operate at multiple frequency bands, and/or multimodal capable, such that they can interoperate with different air interface types.

In one embodiment, user equipment such as user equipment 302 communicates via a radio link, such as radio link 322, to a radio unit 304. In one embodiment, there may be a one-to-many relationship between the radio unit 304 and the user equipment 302. The radio unit 304 provides the RF front ends for each of the air interface implementations in operation. The radio unit 304 also provides the means to effectively communicate received signal data in a form suitable for transmission via a digital data network, such as via the network connection 324 (e.g., baseband digital information), to and from an airlink processing unit such as airlink processing unit 306. In one embodiment, the radio unit 304 downconverts, samples, formats and forwards baseband information through a high speed Ethernet link to a central airlink processing unit such as airlink processing unit 306. In one embodiment, the radio unit 304 may be a small, ceiling mounted box that houses printed circuit board PCB modules connected together through a backplane printed circuit board PCB. The radio unit 304 may be remotely powered from the airlink processing unit 306 for ease in deployment.

In one embodiment, the airlink processing unit 306 is the central airlink baseband processing unit for the system. The airlink processing unit 306 receives airlink traffic from and sends airlink traffic to as many as eight radio units 304 simultaneously through multiple network connections such as network connection 324. In one embodiment, airlink processing comprises those physical layer, datalink, and network layer functions required to support the conversion of complex baseband samples to voice encoded bitstreams. Additionally, the airlink processing comprises those operations necessary to process and route IEEE 802.11 WLAN data to external IP networks. Airlink processing units 306 can be distributed throughout the system, thus providing flexible coverage options.

In one embodiment, the airlink processing unit(s) 306 provide(s) the baseband airlink processing for the associated radio elements comprising the radio unit(s) 304 associated with the airlink processing unit(s) 306. The airlink processing units 306 also may function as the interface between multiple radio units 304 and network processing unit 308. In one embodiment, the functions of the airlink processing unit 306 are as follows. Provide an interface for up to 8 radio units 304 for the transfer of voice, WLAN data, control, and configuration information over FAST Ethernet. Distribute timing and power for up to eight radio units 304. Perform baseband signal processing of voice traffic to include channel compensation, symbol mapping, and FEC. Perform partial call processing and airlink protocol stack functions. Route Wireless LAN data to IP networks (LANs/WANs/Internet), and support peer-to-peer traffic only communications between airlink processing units 306.

The network processing unit 308 is the central network processing unit for the system. In one embodiment, network processing comprises those physical layer, datalink, and network layer functions required to convert encoded bitstreams to PCM data and transport that data to the public switched telephone network 316 or to a PBX such as PBX 312. In one embodiment, the network processing unit 308 is also the central management entity for the system from which all configuration and user information is managed. In one embodiment, in support of circuit switched voice traffic from user equipment such as user equipment 302, the network processing unit 308 provides two telecommunication system interfaces, a Q.931 or RBS interface to a PBX such as PBX 312 (e.g., interface 334), and an analog line or RBS interface to the public switched telephone network 316 (e.g., interface 336). In addition, the network processing unit 308 generates and relays signaling messages to the mobility networks through the gateway unit 310. In order to centralize network control, in an actual implementation there may be a one-to-many relationship between the network processing unit 308 and airlink processing units 306. In one embodiment, with the exception of voice-over-Internet-protocol (VOIP) applications and voice traffic processed through a gateway or direct connection to a mobile switching center, as described more fully below, voice traffic is routed to the public switched telephone network 316 through the PBX 312 or the interface 336. When implemented, VoIP traffic is routed in one embodiment through an Ethernet connection to a gateway function, such as via connection 330 to IP network 320 and connection 332 to gateway unit 310.

The network processing unit 308 contains a central user database (not shown). The user database has information about all users of the system whether active or not, and regardless of which airlink processing unit 306 is being used. For the mobility features, a visitor location register VLR for each user resides within the user database. Similarly, for Wireless LAN (or more generically packet switched device) users, information about the location, status, authorization, identity (MAC and IP address), care of address (for MobileIP), type of device, security and features for each user is stored in the user database. The user database is a central system repository for information about a user. If the system is part of a multisystem installation and the customer wishes to manage users centrally, the network processing unit 308 may simply contain a link to an externally located user database. In one embodiment, this is configurable upon installation. Similarly, the network management system may require a centralized server or system that contains links to the various underlying system installations. Unlike the centralized user database, the network management system information would still be distributed and stored locally at each system. The central network management system server would contain additional display and possibly statistical data collection and analysis capabilities that levered the local system information.

In one embodiment, the gateway unit 310 primarily functions as a protocol translator between network processing units such as network processing unit 308 and mobile switching centers such as mobile switching center 314. In that capacity, the gateway unit 310 terminates the transport protocol TCP, extracts the message contents, re-encapsulates it as a signaling message (MAP, INAP or IS-41), and forwards it to the correct mobile switching center or STP over an interface such as interface 340 to SS7 network 342. Each gateway unit 310 is connected to a serving mobile switching center such as mobile switching center 314, and/or an external signaling network such as SS7 network 342, for message delivery. A single gateway unit 310 may forward traffic to and from many network processing units 308. Each gateway unit 310 is located at or near a mobile switching center such as mobile switching center 314 or a Point of Presence connected to a signaling network and the Internet. A separate Internet connection to the gateway unit 310 is required for an OAMP interface and forwarding of signaling packets to other mobile switching centers.

In one alternative embodiment, the network processing unit 308 may be configured to use Signaling Transport (SIGTRAN) or another suitable protocol to transport SS7-based signaling, such as Mobile Application Part (MAP) signaling, over IP and/or other packetswitched data networks, such as system local area network 318 and/or IP network 320. In one such alternative embodiment, so configuring the network processing unit 308 eliminates the need to provide a separate gateway unit such as gateway unit 310, and gateway unit 310 may be omitted from system 300 in such an embodiment.

The mobile switching center 314 provides the basic switching functions and coordinates the establishment of calls to and from the mobile subscribers. The mobile switching center 314 may also be directly responsible for transmission facilities management, mobility management, and call processing functions. A home location register for cellular subscribers is located and associated with a mobile switching center such as mobile switching center 314. Additionally, a visitor location register for active roaming cellular system users is located and associated with a mobile switching center such as mobile switching center 314.

The private branch exchange 312 is a local digital switch. PBX 312 provides the basic interface necessary to send and receive telephone calls to and from the public switched telephone network 316, and may also provide features like call forwarding, voicemail, automatic routing, and four-digit dialing.

The public switched telephone network 316 comprises the regular wire line telephone network that provides service to the general public. Ordinary telephones, key telephone systems, PBX trunks, and data transmission equipment commonly access the public switched telephone network 316. The interface 336 from the network processing unit 308 to the public switched telephone network 316 provides the ability to originate calls to wireline phones and terminate calls from wireline phones.

In one embodiment, the system LAN 318 is a Fast Ethernet LAN that may use a private addressing scheme for the communication among network elements. The network may comprise a number of nodes interconnected through bridges, hubs, switches and/or routers. The system LAN 318 is differentiated from other existing or co-located LANs because there are inherent timing and latency requirements placed on the system LAN that may not be supported in a typical LAN installation. Much of the circuit switched data is relatively time critical. The system LAN 318 may in one embodiment accommodate a variety of building configurations with lengths longer than the 100 m limit on single CAT-5 runs. Standard LAN equipment can be used to connect remote airlink processing units 306 with the network processing units 308 and the IP network 320. In its simplest star implementation, the system LAN 318 may be implemented with cables from the airlink processing units 306 to the network processing unit 308 and a single connection to an external data network. System timing distribution via packets can be utilized to use off-the-shelf Ethernet equipment to extend the system LAN 318 beyond simple point-to-point wired connections, as is described in a copending and commonly assigned U.S. Patent Application titled "Method and Apparatus for Frequency and Timing Distribution Through a Packet-Based Network," U.S. patent application Ser. No. 10/132,086, filed Apr. 24, 2002, which is hereby incorporated herein by reference in its entirety.

In one embodiment, the system LAN 318, the network processing unit 308, the network connection 328, the network connection 326, the airlink processing unit 306, the network connection 324, and the radio unit 304 comprise a private, integrated system configured to perform distributed processing of received and outgoing wireless communication signals as described herein, prior to the transmission of outgoing signals in the case of outgoing signals and/or prior to any interaction, if any, with any external environment in the case of received signals. In one embodiment, such distributed processing within the private, integrated system described above facilitates the fast, efficient processing of received and outgoing signals by the processing components described above, and the fast, efficient transport of associated data packets over the network connections comprising the private system.

In one embodiment, the efficiency of the communication between components of the private system over associated network connections may be improved by defining one or more virtual local area networks (VLANs) within the private system. For example, in one embodiment, further efficiencies may be achieved by defining one or more VLANs dedicated to handling a particular type of message, such as messages associated with a particular wireless communication standard, as in an embodiment in which the private system is configured to handle communications under more than one wireless communication standard. In one embodiment, defining such dedicated VLANs may improve the overall efficiency of the private system by providing a way to optimize network communications in each different VLAN for the type of network traffic associated with the wireless standard to which the VLAN is dedicated. In one embodiment, one or more VLANs may be defined to handle other specific types of messages, such as timing and/or control messages, to ensure or further ensure that such messages are timely delivered. In one embodiment a VLAN may be defined that comprises the radio unit 304, the network connection 324, and the airlink processing unit 306. In one embodiment, defining such a VLAN provides for the efficient handling of the potentially very heavy network traffic between the radio unit 304 and the airlink processing unit 306 without affecting adversely the network traffic between the airlink processing unit 306 and the network processing unit 308 over system LAN 318 and the associated network connections 326 and 328.

The IP Network 320 may in one embodiment be a public or private IP-based Local Area Network (LAN) or Wide Area Network (WAN) that uses a standard, public addressing scheme for the communication among network elements. The network consists of a number of nodes interconnected through bridges, hubs, switches and routers. This network may be the Internet, another public network, or it may be a private network. It may also be a concatenation of multiple IP networks.

The interface 322 is the air interface for the system, as shown between the user equipment 302 and the radio unit 304. In one embodiment, the air interface 322 may be one of several types of interfaces. Some types of interfaces are listed below. It will be understood that these are merely provided as examples and that other types of air interfaces can also be supported by the system. One type of air interface is a standard European GSM air interface operating in either the 900 MHz cellular or 1800 MHz DCS bands. A second is the IEEE 802.11b high-rate air interface operating in the 2.4 GHz ISM band. A third air interface is the iDEN air interface operating in the 800 MHz SMR band. A fourth is the PCS-1900 air interface modified from the European ITU standard to operate in North American PCS frequencies. Again, numerous other types of air interfaces may be used.

A network connection such as connection 324 connects each radio unit 304 to its serving airlink processing unit 306. In one embodiment, each airlink processing unit 306 supports as many as 8 radio units such as radio unit 304. In one embodiment, power, user data, system timing and control information are passed over this interface. All signals destined for the user equipment 302 or the radio unit 304 are sent from the airlink processing unit 306 over a network connection such as connection 324. Conversely, all signals from the user equipment such as user equipment 302 or radio units such as radio unit 304 destined for the system are sent over a network connection such as network connection 324. In one embodiment, a standard Fast Ethernet (100baseT) is used in a point-to-point configuration as a transport mechanism to carry bits between the radio units 304 and airlink processing units 306. In one embodiment, standard CAT-5 wiring is used to carry the Ethernet signals. The same CAT-5 wiring is also used to send DC power and a system clock from the airlink processing unit 306 to the radio units 304.

The network connection 326 is a standard Fast Ethernet interface. All system information between the airlink processing units 306 and network processing unit 308 flows over the network connection 326 as packetized Ethernet data. Only the addressing space and timing requirements differentiate the network connection 326 from network connection 330.

The network connection 330 is an IP network interface. Traffic bound to and from any publicly addressable IP address outside the system will be routed through this interface. Any system traffic destined for or arriving from the Internet travels across this interface. The physical and MAC layer implementation of this interface may be implemented in a variety of ways. For instance, the IP traffic can be routed over an Ethernet interface to an Ethernet switch and ultimately to a router-based network.

The interface 344 is a standard Ti/El or ISDN Primary Rate Interface (Q.931) to a PBX. The interface 336 is a standard digital (T1 RBS or E1 CCS) or analog line interface to the public switched telephone network 316. The interface 338 is a persistent, dial-up or dedicated circuit connection between the network processing unit 308 and the gateway unit 310. Cellular and PCS signaling in the form of TCP/IP wrapped MAP, INAP or IS-41 messages between the system and the mobility intelligent networks are sent over the interface 338. The interface 340 is a switch-to-switch intersystem signaling interface. In support of an IS-136 network implementation, the interface H carries IS-41 messages over the SS7 network SS7N. To support a PCS-1900 or GSM network implementation, the interface 340 carries MAP and INAP messages over the SS7 network SS7N.

As discussed above, the radio unit 304 provides the front-end processing for the different air interfaces supported by the system. This may include in one embodiment RF conversion to and from baseband, digital sampling and analog reconstruction, clock distribution, scanning for macrocell signals, and communications with the airlink processing unit 306. Through these functions, the system serves as the access interface between signals received from mobile terminals, via a standard airlink, and the baseband and/or other intermediate processing performed in the airlink processing unit 306.

The system of the present invention is also described in provisional U.S. patent application Ser. No. 60/359,637, from which this application claims priority, and which is hereby incorporated herein by reference in its entirety. A related system is described in provisional U.S. Patent Application Ser. No. 60/359,638, filed Feb. 25, 2002, entitled, "SYSTEM AND METHOD FOR WIRELESS SIMULCASTING IN A DISTRIBUTED RADIO SYSTEM", which is hereby incorporated by reference in its entirety, and in a U.S. patent application Ser. No. 10/197,320, entitled "DISTRIBUTED RADIO SYSTEM WITH MULTIPLE TRANSCEIVERS FOR SIMULCASTING AND SELECTIVE PROCESSING OF RECEIVED SIGNALS", filed Jul. 16, 2002, which is also hereby incorporated herein by reference in its entirety.

Figure 4:
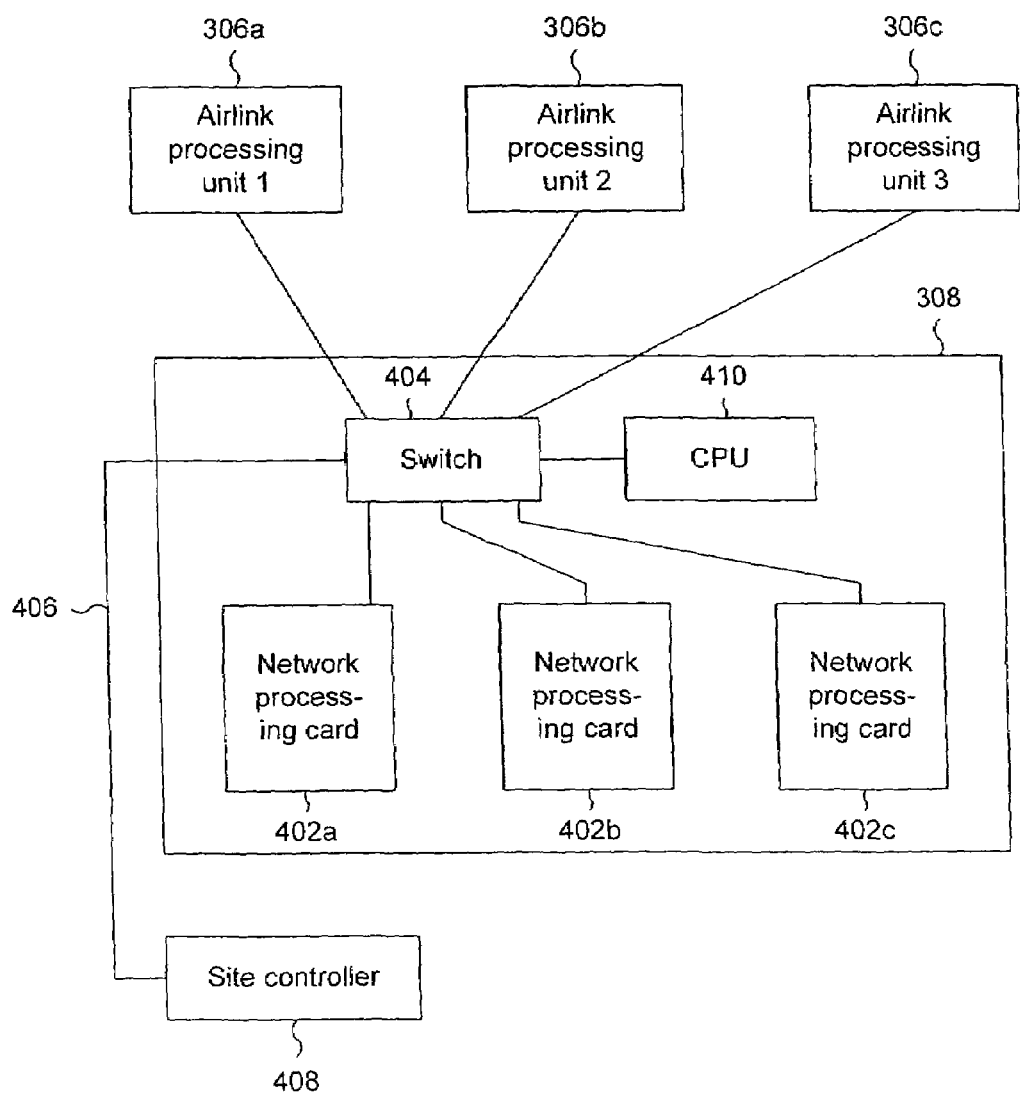
FIG. 4 shows one embodiment with a network processing unit 308 coupled to three airlink processing units 306a, 306b, and 306c.

FIG. 4 shows one embodiment with a network processing unit 308 coupled to three airlink processing units 306*a*, 306*b*, and 306*c*. The network processing unit 308 serves as a central processing unit and is coupled in one embodiment through Ethernet links to airlink processing units 306*a*, 306*b*, and 306*c*. The network processing unit 308 is responsible for interfacing the system to external environments, such as a macrocellular system or the PSTN, as well as network management of the overall system.

The network processing unit 308 comprises network processing cards 402*a*, 402*b*, and 402*c*. The network processing unit 308 also comprises a switch 404. In one embodiment, the switch 404 comprises an Ethernet switch. The switch 404 is coupled through a connection 406 to an integrated site controller 408. In one embodiment, the connection 406 comprises an Ethernet link. The integrated site controller 408 in one embodiment comprises an access control gateway (not shown). The switch 404 is connected to and operates under the control of a central processing unit (CPU) 410.

Figure 5:
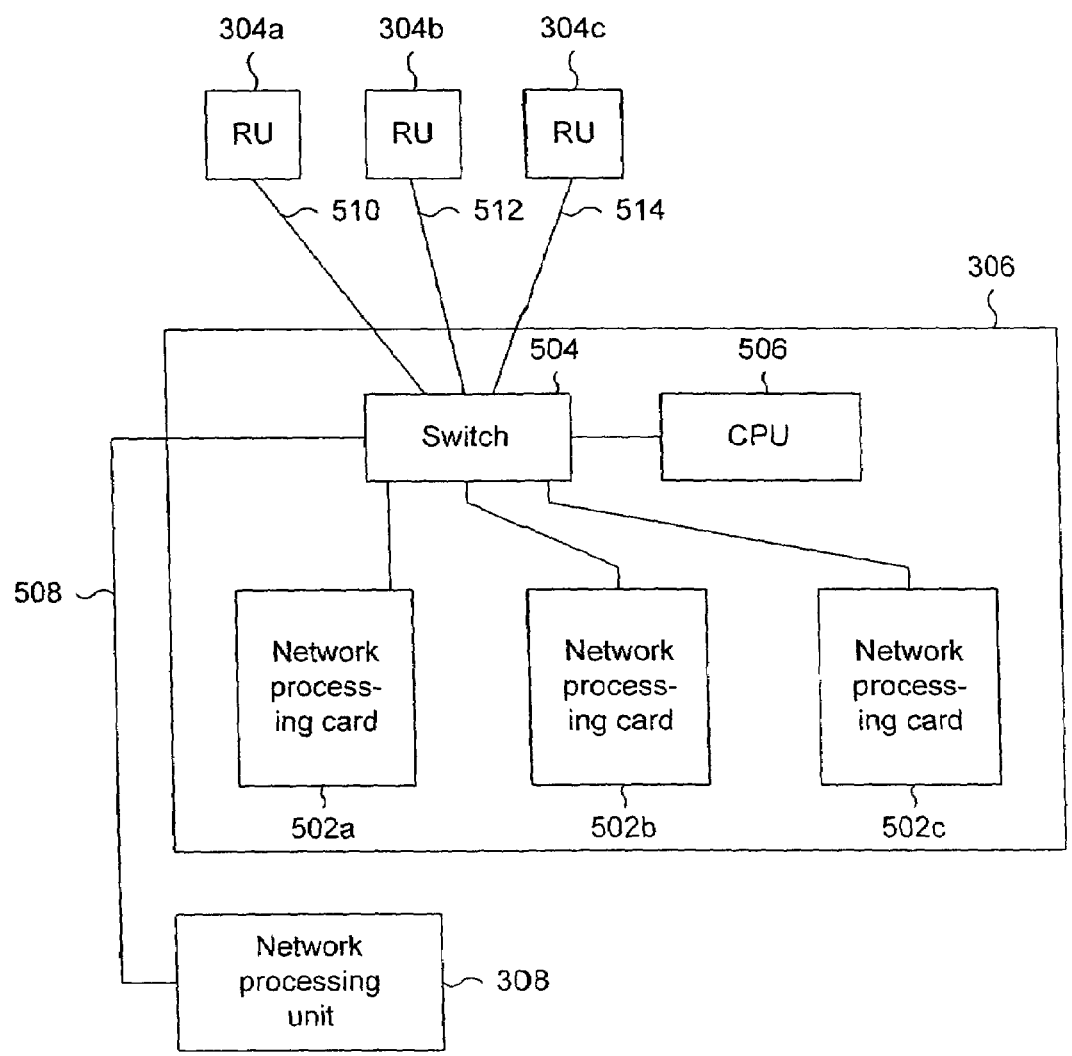
FIG. 5 shows further details of an airlink processing unit 306 used in one embodiment.

FIG. 5 shows further details of an airlink processing unit 306 used in one embodiment. The airlink processing unit 306 shown in FIG. 5 comprises a set of airlink processing cards 502*a*, 502*b*, and 502*c*. The airlink processing unit 306 also comprises a switch 504 connected to and operated under the control of a CPU 506. In one embodiment, the switch 504 comprises an Ethernet switch. Switch 504 is coupled through a connection 508 to network processing unit 308. In one embodiment, the connection 508 comprises an Ethernet link. In one embodiment, the connection 508 connects the switch 504 with a switch associated with the network processing unit 308, such as the switch 404 shown in FIG. 4. The switch 504 is further coupled through connections 510, 512, and 514 to a series of radio units 304*a*, 304*b*, and 304*c*. In one embodiment, the each of the connections 510, 512, and 514 corresponds to the connection 324 of FIG. 3. In one embodiment, each of the radio units 304*a*-*c* includes one or more protocol- or standard-specific modular radio elements (not shown in FIG. 5) for transmitting signals. The modular radio elements are described more fully below in connection with FIGS. 6 and 7.

Figure 6:
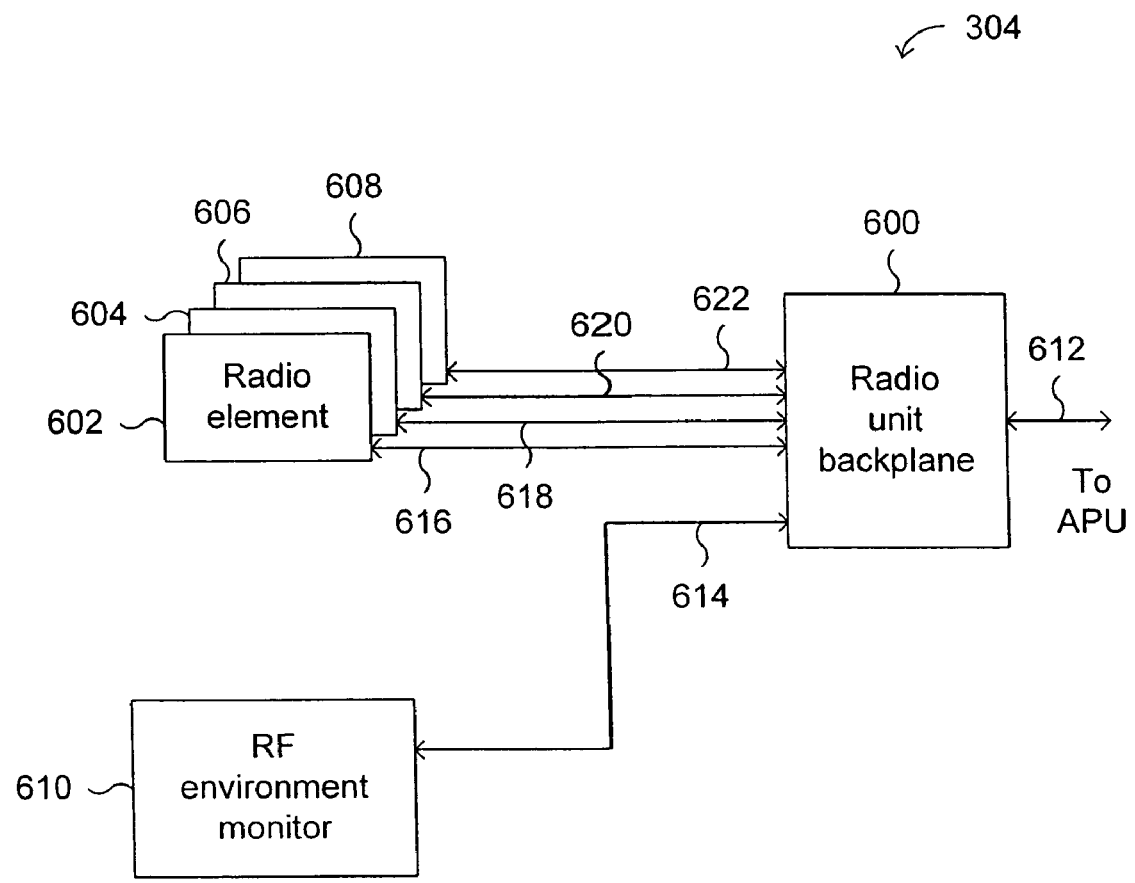
FIG. 6 shows a functional diagram of a radio unit 304 used in one embodiment.

FIG. 6 shows a functional diagram of a radio unit 304 used in one embodiment. The radio unit 304 is shown to comprise a radio unit backplane 612 to which four modular radio elements 602, 604, 606, and 608 are connected. The radio unit backplane 612 is connected by a connection 612 to an associated airlink processing unit (APU) such as airlink processing unit 306 of FIG. 3. In one embodiment, the connection 612 corresponds to the connection 324 of FIG. 3. As shown in FIG. 6, a radio frequency (RF) environment monitor 610 also is connected to radio unit backplane 610. In one embodiment, a single radio unit 304 can accommodate up to 7 modular radio elements such as radio elements 602-608, or 6 modular radio elements plus one RF environment monitor such as RF environment monitor 610. Antenna functions will be performed locally on the radio elements 602-608. Each radio element 602-608 provides the airlink interface for the protocol or standard supported by that particular radio element. The RF environment monitor 610 in one embodiment is a multiband receiver that provides macrocell scanning capability for radio unit 304 channel allocation while the radio unit backplane 600 allows point-to-point communications with the airlink processing unit 306 through Layer 2 Ethernet switching. In one embodiment, communications between each module and the radio unit backplane 600 will occur via an associated Ethernet MII backplane connection.

As mentioned above, in one embodiment radio elements such as radio elements 602-608 provide the front-end air interface for the reception and transmission of signals to and from mobile terminals in a cell. The specifications for the air interface, and therefore, the exact functionality of the radio element, will be governed by the standard supported for that radio element module. A single radio element such as radio elements 602-608 may be configurable to support more than one standard and/or multiple frequency bands, but will be configured to operate with a single air interface defined at a particular band. In one embodiment, the radio elements 602-608 are not dynamically reassigned, but may be remotely reconfigured on a nondynamic basis.

In one embodiment, the radio unit backplane 600 comprises a backplane switch (not shown) and each radio element such as radio elements 602-608 will have a point-to-point connection with the radio unit backplane switch for the transfer of I and Q samples or baseband symbols, packet WLAN data, control traffic, and module. configuration information. In one embodiment, each radio element will have separate backplane connections for the transfer of clock and reference timing directly from the airlink processing unit 306 via spare CAT-5 pairs. In one embodiment, DC power will also be received on the CAT-5 wiring and distributed to the radio elements 602-608 through the backplane 600. The backplane connections 616, 618, 620, and 622 in one embodiment represent all of the various point-to-point backplane connections made between the respective radio elements 602-608 and the radio unit backplane 600.

In one embodiment, each radio element may comprise a time base to ensure proper transmission at the radio frequency front end in order to compensate for the fact that data to be transmitted by the radio element will not have a guaranteed arrival time due to unpredictable network delays. In one embodiment, the radio element time base may be synchronized with a second time base associated with the airlink processing unit with which the radio unit comprising the radio element is associated, by means of the clock and/or reference timing signals received from the airlink processing unit 306 via spare CAT-5 pairs as described above. In one embodiment, the radio element time base and the airlink processing unit time base may be further synchronized with a third time base associated with the network processing unit 308. Such further synchronization may be accomplished in one embodiment using the approach described in U.S. patent application Ser. No. 10/132,086, titled "Method and Apparatus for Frequency and Timing Distribution Through a Packet-Based Network," filed Apr. 24, 2002, which was incorporated herein by reference above.

When voice standards are supported, as shown in FIG. 6 an RF environment monitor 610 may be present in the radio unit 304 to provide information on surrounding macrocellular systems in the 800 MHz CMRS, 800 MHz SMR, PCS 1900 MHz, and European bands. This information may be presented in the form of signal energy levels, I and Q samples, demodulated data or demodulated control traffic to the radio management entities in the airlink processing unit 306 or network processing unit 308. The RF environment monitor 610 in one embodiment has a point-to-point connection with the radio unit 304 backplane switch for the transfer of voice, data, control traffic, and/or module configuration information. Additionally, the RF environment monitor REM will have backplane connections for the transfer of clock and reference timing directly from the CU via spare CAT-5 pairs. As with the radio blades RB, the RF environment monitor REM will receive DC power from the backplane. The backplane connection 614 shown in FIG. 6 in one embodiment represents all of the various point-to-point backplane connections between the RF environment monitor 610 and the radio unit backplane 600.

In one embodiment, a single radio unit 304 is made to support up to three 802.11 radio elements, such as radio elements 602-608, in combination with up to 4 additional mobility radio elements. However, in one embodiment up to 7 mobility radio elements can be present when no WLAN radio elements are used.

In one embodiment, the primary functions of a radio element such as radio elements 602-608 are as follows. Providing an antenna or connection to an antenna module. Performing RF downconversion of signals received from mobile units, and RF upconversion of baseband signals to be transmitted to mobile units. Performing digital sampling of quadrature demodulated I and Q data, analog reconstruction of digital I and Q data for quadrature modulation, and possible demodulation of I and Q samples into baseband symbols. Performing digital processing of WLAN data including airlink MAC, service administration, and complete Layer 1 & 2 processing of Ethernet packets for transfer between the user equipment 302 and the airlink processing unit 306 (802.11 radio element only). Performing clock manipulation and distribution for multiprotocol compatibility. Providing an Ethernet MII Interface to the radio unit 304 backplane switch. Performing RF control (power level adjustments, RF channel selection, baseband signal biasing, receive and transmit gain adjustments) based on received control information. Providing storage of localized configuration information as needed. In one embodiment, each radio element module is configured to perform these functions under the ultimate control of the airlink processing unit 306 and network processing unit 308.

Three examples of radio element designs that can be implemented in one embodiment are: (1) a single radio element that can be configured to support mobility standards at 800 MHz, 1900 MHz and European mobility bands, (2) 800 MHz iDEN, and (3) 802.11b Wireless LAN.

Figure 7:
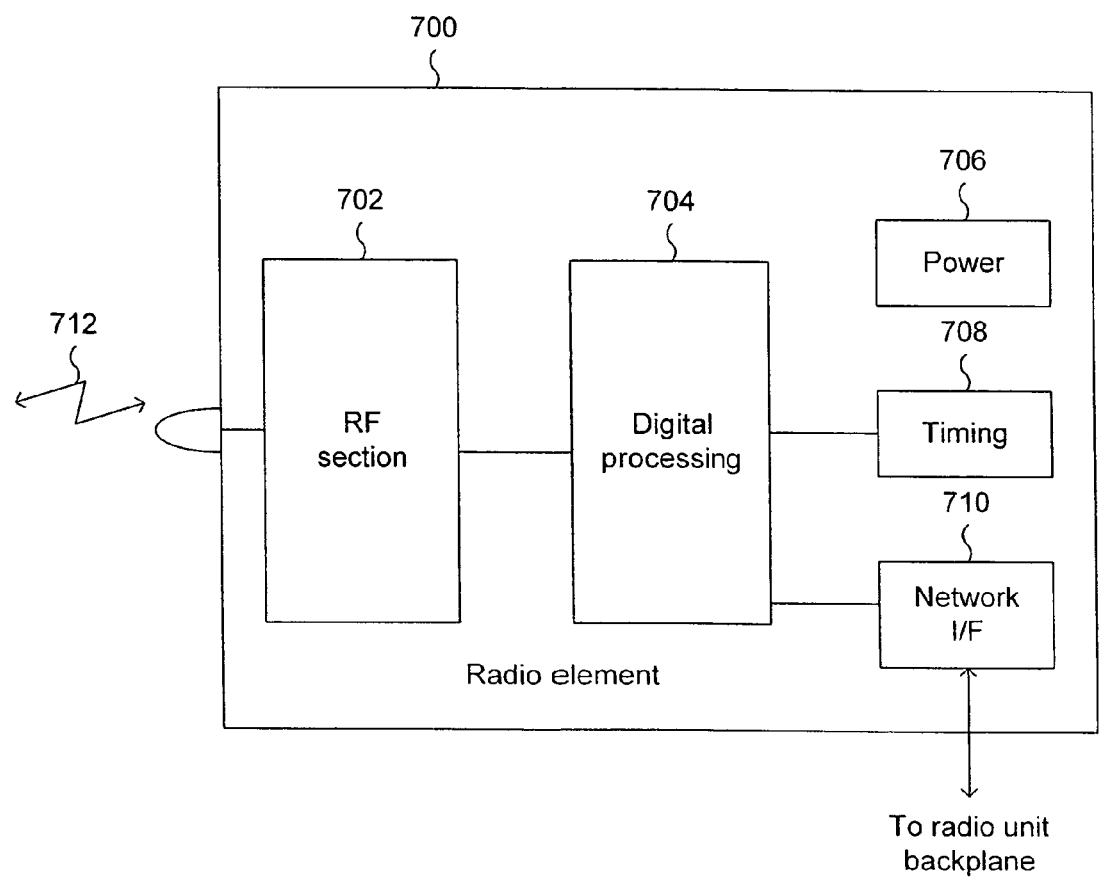
FIG. 7 shows the functional components of a radio element 700, such as may in one embodiment correspond to one or more of radio elements 602-608 of FIG. 6.

FIG. 7 shows the functional components of a radio element 700, such as may in one embodiment correspond to one or more of radio elements 602-608 of FIG. 6. As illustrated, the radio element 700 comprises an RF section component 702, which is coupled to a digital processing component 704. Also included are a power component 706, a timing component 708, and a network interface 710. In one embodiment, the network interface 710 comprises an Ethernet component. The network interface 710 provides the communication to the radio unit backplane, such as radio unit backplane 600 of FIG. 6. The radio element 700 also communicates over an air interface 712, as was described above in connection with the air interface 322 shown in FIG. 3.

The primary function of the RF environment monitor 610 of FIG. 6 is to provide the airlink processing unit 306 and network processing unit 308 with information on the presence or absence of macrocell signals in the CMRS, SMR, and PCS bands. The presence or absence of Wireless LAN signals in the ISM band are left to the 802.11b MAC protocol to handle collisions between packets in adjacent radio unit 304 cells. 802.11b frequency assignments are configurable from the network processing unit 308 remotely through the web-based system network management interface as is the case with all system configuration information. The information provided by the RF environment monitor 610 is used by the airlink processing unit 306 and network processing unit 308 to allocate voice channels in a manner that avoids interference between macrocell and radio unit 304 links.

The RF environment monitor 610 forwards received data to the airlink processing unit 306 for further processing. Simple energy measurements are made on an ongoing basis to track voice traffic channels dynamically. Initially, observing demodulated control channel information allows for the construction of a table of control channels in surrounding macrocells. This table can be updated periodically as needed. The RF environment monitor 610 takes advantage of the reciprocal nature of the FDD uplink and downlink channels and only scans the receive band at the radio unit RFU.

Figure 8:
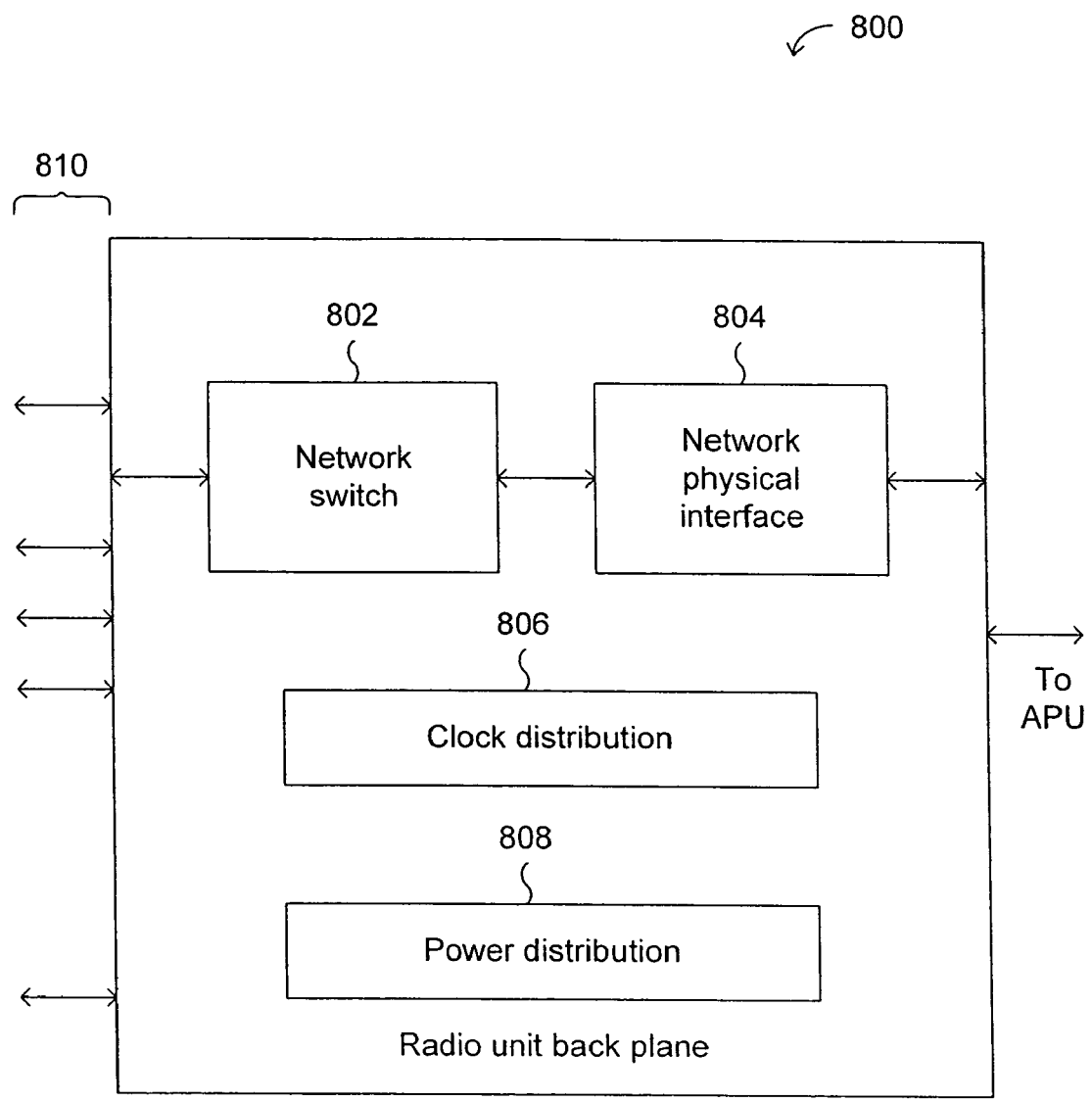
FIG. 8 illustrates the functional components of a radio unit backplane interface 800 used in one embodiment to provide a radio unit back plane such as radio unit backplane 600 of FIG. 6.

FIG. 8 illustrates the functional components of a radio unit backplane interface 800 used in one embodiment to provide a radio unit back plane such as radio unit backplane 600 of FIG. 6. The radio unit backplane interface 800 of the radio unit 304 facilitates high-speed intermodule communications between radio unit 304 components as well as communications between radio unit 304 modules and the airlink processing unit 306. In one embodiment, the radio unit backplane interface 802 comprises a network switch 802, which satisfies the bandwidth requirements for all of these communications including the voice, data, and control traffic of the iDEN, PCS-1900, GSM, 802.11b radio element and RF environment monitor 610 modules. In one embodiment, the switch 802 comprises an Ethernet 10/100BaseT layer 2 switch. The switch 802 is coupled to a network physical interface 804. In one embodiment, the switch 802 comprises a 100BaseT physical interface. The radio unit backplane interface 800 also comprises a clock distribution component 806 configured to provide a clock signal to the radio element(s) and/or RF environment monitors connected to the backplane, and a power distribution component 808 configured to supply power to such components. In other embodiments, not illustrated in FIG. 8, other approaches may be used to supply a clock signal and/or power to such components.

Referring further to FIG. 8, the radio unit backplane interface 800 further comprises a plurality of point-to-point connections 810, each of which represents the termination of a point-to-point connection between a radio element, such as radio elements 602, 604, 606, and 608 of FIG. 6, on the one hand, and the radio unit backplane, such as radio unit backplane 600 of FIG. 6, on the other, so that all voice, data, and control traffic must be routed through this interface. Therefore, in one embodiment, the radio unit backplane interface 800 may provide all of the necessary multiplexing and demultiplexing of data between the radio units such as radio unit 304 and the airlink processing unit 306. In one embodiment, packetizing all radio element/RF environment monitor data into Ethernet MAC frames on the radio elements/RF environment monitors and transferring this data via MII interfaces to an Ethernet switch accomplishes this. In one embodiment, the radio unit backplane interface switch 802 performs a bridge function that forwards Ethernet data from one radio element to another radio element, or to the airlink processing unit 306, with minimal delay. The one exception to this paradigm in one embodiment is the reference clock from the airlink processing unit 306. To ensure the integrity of the reference clock, it is generally routed directly to the radio element modules, after fan-out in the backplane, from the airlink processing unit 306 without packetization.

While the preferred embodiment of the invention has been illustrated and described, it will be appreciated that various changes can be made therein without departing from the spirit and scope of the invention.

What is claimed is:

1. A distributed radio system for communication between a wireless user equipment and a network comprising:
   a radio unit configured to:
      transmit outgoing radio frequency signals to the user equipment;
      receive incoming radio frequency signals from the user equipment; and
      perform radio-level processing on data associated with received and outgoing signals;
   an intermediate-level processing unit configured to perform intermediate-level processing on data associated with received and outgoing signals;
   a first connection between the radio unit and the intermediate-level processing unit;
   a network-level processing unit configured to perform network-level processing on data associated with received and outgoing signals; and
   a second connection between the intermediate-level processing unit and the network-level processing unit, said second connection comprising a network connection;
   wherein the radio unit, the intermediate-level processing unit and the network-level processing unit comprise an integrated, private system, whereby incoming and outgoing signals are processed in a distributed manner within said private system prior to any interaction, if any, with any external environment.

2. The distributed radio system of claim 1, wherein the first connection comprises a network connection.

3. The distributed radio system of claim 1, wherein the radio-level processing comprises RF processing.

4. The distributed radio system of claim 1, wherein the radio-level processing comprises, with respect to an outgoing signal, performing digital signal processing on data received from the intermediate-level processing unit via the first connection.

5. The distributed radio system of claim 1, wherein the radio-level processing comprises, with respect to a received signal, performing digital signal processing on data associated with the received signal and sending the processed data to the intermediate-level processing unit via the first connection.

6. The distributed radio system of claim 5, wherein the first connection comprises a network connection and wherein performing digital signal processing on data associated with the received signal comprises processing the received signal into a form suitable for being communicated via a digital network.

7. The distributed radio system of claim 6, wherein processing the received signal into a form suitable for being communicated via a digital network comprises extracting base-band data from the received signal.

8. The distributed radio system of claim 6, wherein processing the received signal into a form suitable for being communicated via a digital network comprises shifting the received signal down into a frequency range suitable for being processed into digital form by an analog to digital converter.

9. The distributed radio system of claim 1, wherein the intermediate-level processing comprises, with respect to data associated with a received signal, processing said data associated with a received signal into one or more protocol-appropriate data units.

10. The distributed radio system of claim 9, wherein the intermediate-level processing further comprises sending said one or more protocol-appropriate data units to the network-level processing unit via the second connection.

11. The distributed radio system of claim 1, wherein the intermediate-level processing comprises, with respect to data associated with an outgoing signal, receiving one or more protocol-appropriate data units from the network-level processing unit via the second connection.

12. The distributed radio system of claim 11, wherein the intermediate-level processing further comprises performing digital signal processing on said one or more protocol-appropriate data units and sending the processed data to the radio unit via the first connection.

13. The distributed radio system of claim 1, wherein the network-level processing unit is configured to perform signal routing.

14. The distributed radio system of claim 1, wherein the intermediate-level processing unit is configured to perform signal routing.

15. The distributed radio system of claim 1, wherein the network-level processing unit is configured to perform speech transcoding.

16. The distributed radio system of claim 1, wherein the intermediate-level processing unit is configured to perform speech transcoding.

17. The distributed radio system of claim 1, wherein the intermediate-level processing unit is configured to perform layer 2 network processing.

18. The distributed radio system of claim 1, wherein the network-level processing unit is configured to perform layer 2 network processing.

19. The distributed radio system of claim 1, wherein the intermediate-level processing unit is configured to perform wireless simulcasting.

20. The distributed radio system of claim 1, wherein the network-level processing unit is configured to perform wireless simulcasting.

21. The distributed radio system of claim 1, wherein the network-level processing unit is configured to interface to an external environment, whereby the user equipment may communicate to the external environment via the distributed radio system.

22. The distributed radio system of claim 21, wherein the external environment comprises the public switched telephone network.

23. The distributed radio system of claim 21, wherein the external environment comprises a mobile telephony system.

24. The distributed radio system of claim 23, wherein the mobile telephony system comprises a cellular telephone system.

25. The distributed radio system of claim 23, wherein the mobile telephony system comprises a voice over Internet protocol network (VoIP) telephony system.

26. The distributed radio system of claim 21, wherein the external environment comprises an external data network.

27. The distributed radio system of claim 26, wherein the external data network comprises a packet-switched data network.

28. The distributed radio system of claim 27, wherein the packet-switched data network comprises an Internet protocol (TP) network.

29. The distributed radio system of claim 1, wherein the network-level processing unit is configured to interface to a plurality of external environments, whereby the user equipment may communicate via the distributed radio system to a selected one of said plurality of external environments.

30. The distributed radio system of claim 1, wherein the first connection comprises a network connection and wherein the radio unit comprises at least one radio element, the radio element comprising a radio frequency front end and a network interface.

31. The distributed radio system of claim 30, wherein the radio element further comprises a first time base to ensure proper transmission at the radio frequency front end in order to compensate for the fact that the data to be transmitted by the radio element will not have a guaranteed arrival time due to unpredictable network delays.

32. The distributed radio system of claim 31, wherein the intermediate-level processing unit comprises a second time base and the first time base is substantially synchronized with said second time base.

33. The distributed radio system of claim 32, wherein the intermediate-level processing unit is configured to provide a timing signal to the radio unit with which the radio element is associated and the radio unit with which the radio element is associated is configured to synchronize the first time base with the second time base using said timing signal.

34. The distributed radio system of claim 33, wherein the first connection comprises a network cable and the timing signal is transmitted from the intermediate-level processing unit to the radio unit via one or more extra wire pairs in said cable.

35. The distributed radio system of claim 32, wherein the network-level processing unit comprises a third time base and wherein said third time base is substantially synchronized with the first time base and the second time base.

36. The distributed radio system of claim 35, wherein the network-level processing unit is configured to synchronize the third time base with the first time base and the second time base by sending synchronization-related communications over the second connection.

37. The distributed radio system of claim 1, wherein the first connection comprises a layer 2, point-to-point Ethernet path.

38. The distributed radio system of claim 1, wherein the radio unit comprises one of a plurality of radio units and the first connection comprises a layer 2, point-to-multipoint Ethernet path.

39. The distributed radio system of claim 1, wherein the radio unit comprises one of a plurality of radio units, each radio unit having a network connection to the intermediate-level processing unit, and each radio unit transmits and receives modulated baseband data traffic to and from the intermediate-level processing unit through its associated network connection.

40. The distributed radio system of claim 39, wherein the data traffic includes data for at least one digital radio protocol.

41. The distributed radio system of claim 39, wherein each radio unit may be configured to support wireless communications under one or more of a plurality of wireless communication standards, and wherein the data traffic may comprise data traffic associated with multiple radio standards simultaneously; whereby communications under multiple wireless communication standards may be processed simultaneously by the distributed radio system and/or transported between system components via the same network connections.

42. The distributed radio system of claim 41, wherein each radio unit comprises, for each wireless communication standard the radio unit is configured to support, at least one radio element configured to support said wireless communication standard.

43. The distributed radio system of claim 42, wherein each radio element comprises a modular unit configured to support one or more of the wireless communication standards that each of the radio units may be configured to support, and the set of wireless communication standards a particular radio unit is configured to support is determined by which modular radio elements have been installed in that particular radio unit.

44. The distributed radio system of claim 39, wherein each radio unit includes operational parameters and further comprising an integrated system manager to selectively control and monitor said operational parameters, whereby the radio unit does not require an external management process such as through a macrocellular system controller.

45. The distributed radio system of claim 1, wherein:
the radio unit comprises one of a plurality of radio units;
the intermediate-level processing unit comprises one of a plurality of intermediate-level processing units;
each radio unit is associated with and has a network connection to a corresponding one of the plurality of intermediate-level processing units; and
each radio unit transmits and receives modulated baseband data traffic to and from the intermediate-level processing unit with which it is associated through its corresponding network connection to said intermediate-level processing unit with which it is associated.

46. The distributed radio system of claim 45, wherein the network-level processing unit comprises one of a plurality of network-level processing units, and each intermediate-level processing unit of said plurality of intermediate-level processing units is associated with and has a corresponding network connection to at least one of said plurality of network-level processing units.

47. The distributed radio system of claim 1, wherein the user equipment comprises a cellular communication device.

48. The distributed radio system of claim 1, wherein the user equipment comprises a personal digital assistant configured for wireless network communication.

49. The distributed radio system of claim 1, wherein the user equipment comprises a computing device configured for wireless network communication.

50. The distributed radio system of claim 1, wherein the user equipment comprises a wireless telephone.

51. The distributed radio system of claim 1, wherein the first connection comprises a network connection comprising a single network cable, and wherein the intermediate-level processing unit is configured to use said single network cable as a network path for network communications between the intermediate-level processing unit and the radio unit.

52. The distributed radio system of claim 51, wherein the intermediate-level processing unit is further configured to use said single network cable to provide power to the radio unit.

53. The distributed radio system of claim 52, wherein the intermediate-level processing unit is further configured to use said single network cable to provide a timing signal to the radio unit.

54. The distributed radio system of claim 1, wherein the first connection comprises a network connection and the integrated, private system comprises a private network comprising at least one virtual local area network (VLAN), said virtual local area network being configured to handle a defined subset of network communications on said private network.

55. The distributed radio system of claim 54, wherein the defined subset comprises communications between the radio unit and the intermediate-level processing unit over the first connection.

56. The distributed radio system of claim 55, wherein the distributed radio system is configured to process communications associated with a plurality of wireless communication standards and wherein the defined subset comprises communications associated with a specific one of said plurality of wireless communication standards.

\* \* \* \* \*